United States Patent
Reymond

(10) Patent No.: US 12,066,050 B2
(45) Date of Patent: Aug. 20, 2024

(54) FALL PROTECTION DEVICE TO RETAIN AND PREVENT THE FALL OF A CONNECTING PIN

(71) Applicant: MANITOWOC CRANE GROUP FRANCE, Dardilly (FR)

(72) Inventor: Guillaume Reymond, Montilly (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 414 days.

(21) Appl. No.: 17/342,954

(22) Filed: Jun. 9, 2021

(65) Prior Publication Data
US 2021/0388864 A1    Dec. 16, 2021

(30) Foreign Application Priority Data
Jun. 12, 2020   (FR) ..................................... 2006138

(51) Int. Cl.
*F16B 2/08* (2006.01)
*B66C 23/28* (2006.01)
(Continued)

(52) U.S. Cl.
CPC ............ *F16B 41/005* (2013.01); *B66C 23/62* (2013.01); *B66C 23/68* (2013.01); *F16B 41/002* (2013.01)

(58) Field of Classification Search
CPC ...... F16B 2/06; F16B 2/08; F16B 2/10; F16B 7/00; F16B 7/04; F16B 19/02; F16B 21/10; F16B 41/002; F16B 41/005; F16L 21/08; F16L 23/10; B66C 23/62; B66C 23/68; B66C 23/286; B66C 23/705; B66C 1/22;
(Continued)

(56) References Cited

U.S. PATENT DOCUMENTS

| | | | | |
|---|---|---|---|---|
| 2,775,806 A | * | 1/1957 | Love ....................... | F16L 33/12 24/271 |
| 2,788,993 A | * | 4/1957 | Oldham .................. | F16L 23/10 285/148.13 |
| 3,831,771 A | * | 8/1974 | Wiencek ............... | B66C 23/702 212/230 |

(Continued)

FOREIGN PATENT DOCUMENTS

| | | |
|---|---|---|
| CN | 105423024 A | 3/2016 |
| EP | 0530114 A1 | 3/1993 |

(Continued)

OTHER PUBLICATIONS

French Patent Office (INPI) search report dated Mar. 13, 2021 issued in connection with corresponding French Patent Application FR 2006138.

*Primary Examiner* — William D Hutton, Jr.
*Assistant Examiner* — Carl J Carlson
(74) *Attorney, Agent, or Firm* — Cook Alex Ltd.

(57) ABSTRACT

A fall protection device configured to retain and prevent the fall of a connecting pin used for an end-to-end assembly of two frame elements of a structure, the fall protection device includes a clamping collar having at least one internal groove, configurable between an open position capable of authorizing the insertion of an enlarged head of the connecting pin, and at least one closed position capable of locking the enlarged head inside the internal groove. The device further includes a lock cooperating with the clamping collar to lock the clamping collar in the closed position and a mooring link anchored on the clamping collar to moor the device on a fixed element.

15 Claims, 4 Drawing Sheets

(51) Int. Cl.
*B66C 23/62* (2006.01)
*B66C 23/68* (2006.01)
*F16B 2/06* (2006.01)
*F16B 2/10* (2006.01)
*F16B 19/02* (2006.01)
*F16B 21/10* (2006.01)
*F16B 41/00* (2006.01)

(58) Field of Classification Search
CPC ........... B66C 1/42; B66C 23/70; B66C 23/36; B66C 23/702; Y10S 411/999
USPC ........................................................ 411/356
See application file for complete search history.

(56) References Cited

U.S. PATENT DOCUMENTS

| | | | |
|---|---|---|---|
| 4,561,552 A * | 12/1985 | Sterner | B66F 11/046 182/2.11 |
| 4,568,115 A * | 2/1986 | Zimmerly | F16L 23/10 285/411 |
| 5,829,106 A * | 11/1998 | Dams | G02B 6/4444 24/270 |
| 6,056,332 A * | 5/2000 | Foster | F16L 23/10 285/410 |
| 8,784,028 B2 | 7/2014 | Clark | |
| 2001/0048860 A1 | 12/2001 | Ross et al. | |
| 2017/0144865 A1 | 5/2017 | Spencer | |
| 2018/0134524 A1 | 5/2018 | Melvin | |
| 2019/0127184 A1 | 5/2019 | Turner | |
| 2019/0137008 A1 | 5/2019 | Peterson et al. | |

FOREIGN PATENT DOCUMENTS

| | | |
|---|---|---|
| FR | 2680813 A1 | 3/1993 |
| FR | 2781535 A1 | 1/2000 |
| FR | 3014509 A1 | 6/2015 |
| WO | 2017058375 A1 | 4/2017 |

* cited by examiner

FALL PROTECTION DEVICE TO RETAIN AND PREVENT THE FALL OF A CONNECTING PIN

FIELD

The present disclosure relates to a fall protection device to retain and prevent the fall of a connecting pin used for an end-to-end assembly of two frame elements of a structure.

The present disclosure finds a non-limiting application for the retention of a connecting pin used for an end-to-end assembly of two frame elements of a crane structure, for example, of a tower crane mast or crane boom.

BACKGROUND

Conventionally, a tower crane mast is composed of a plurality of vertically stackable frame elements, called to be assembled together, end-to-end, during the mounting of the crane on its operating site, and to be separated from each other when dismounting the crane.

The frame element, usually of square cross section, consist of four corner members (or vertical uprights) which are joined in pairs by lattice or triangulation structures, also called bracing, made up of diagonals and sleepers. During the vertical and end-to-end assembly of the frame elements, the ends of the corner members of two superimposed frame elements are rigidly connected to each other by connecting pins, generally associated with fish plates, as known by example of documents FR3014509A1, FR2781535A1 and FR2680813A1.

The connecting pins have enlarged heads extended by rods (often cylindrical in shape), and they are usually tucked into the corner members from the outside to the inside. During dismounting, the connecting pins are ejected or driven out with a sledgehammer, by striking at the ends of the rods. However, during these ejection operations, it sometimes happens that the connecting pin is catapulted and thus thrown several meters. During operations at height, the connecting pin can therefore drop to the ground.

SUMMARY

The present disclosure proposes to respond to this problem by providing a solution for retaining and preventing the fall of a connecting pin, for example during ejection operations, during the disassembly of the two frame elements.

Thus, the present disclosure proposes a fall protection device, to retain and prevent the fall of a connecting pin used for an end-to-end assembly of two frame elements of a structure, such as for example a crane structure, this fall protection device comprising:
- a clamping collar having at least one internal groove, this clamping collar being configurable between an open position capable of authorizing the insertion of an enlarged head of the connecting pin inside the clamping collar, and at least one closed position capable of blocking the enlarged head of the connecting pin inside the internal groove of the clamping collar;
- a lock cooperating with the clamping collar to lock it in the closed position;
- a mooring link anchored on the clamping collar in order to moor the fall protection device on a fixed element, such as for example one of the two frame elements.

In this way, during the disassembly of the two frame elements, it suffices to open the clamping collar to then tighten it and lock it around the enlarged head of the connecting pin, so as to temporarily secure the clamping collar to the connecting pin. It is also sufficient to moor this clamping collar by means of the mooring link, so that when the connecting pin is ejected (for example by means of a sledgehammer), the latter is retained by the fall protection device, and ends up hanging from the end of the mooring link. Once the connecting pin is ejected, it suffices to pull on the mooring link, then unlock and open the clamping collar to retrieve the connecting pin.

It is of course within the meaning of the present disclosure that a pin designates a physical pin forming an elongated part (for example cylindrical) coupling frame elements together.

Moreover, the mooring link may be formed of a flexible link, such as for example a strap, a cable, a rope, a chain or any other equivalent link. Thus, this mooring link can be moored on the fixed element, for example by belting or by hooking.

According to one feature, the clamping collar is selectively adjustable in several closed positions in which the clamping collar is more or less closed so as to be adapted to several sizes of the enlarged head of the connecting pin, the removable lock being shaped to selectively lock each of the different closed positions.

Thus, with the same clamping collar, several sizes of connecting pin, and more specifically several sizes of enlarged head, can be coupled to the clamping collar, which may be advantageous when, for example, on the same structure, different sizes of connecting pins are used to connect frame elements.

According to one possibility, the clamping collar comprises two jaws connected by a pivot axis, so that the two jaws are coupled in rotation, wherein the two jaws each have an internal groove facing each other so that the enlarged head of the connecting pin can be blocked inside their respective internal grooves in the closed position.

This design with two pivoting jaws is advantageous to be able to easily open and close the clamping collar around the enlarged head of the connecting pin.

According to another possibility, the removable lock cooperates with the two jaws for a locking in the closed position.

According to another possibility, the lock is in the form of a locking pin which is engaged in the closed position through locking holes provided respectively in the two jaws.

Thus, it suffices to align the locking holes of the two respective jaws and then engage the locking pin through them.

Advantageously, the fall protection device comprises a clasp, such as for example a cotter, a pin or a clip, able to cooperate with the locking pin to lock it in position once the locking holes have been passed through.

In one embodiment, at least one of the two jaws has several locking holes, in order to bring closer the two jaws more or less from one another and thus define several closed positions depending on whether the locking pin is engaged through a particular locking hole.

Thus, with several locking holes on at least one of the two jaws, it is possible to define several closed positions, more or less closed, for the clamping collar, and therefore to be able to be adapted to several sizes of the enlarged head of the connecting pin.

In one embodiment, the clamping collar has a hoop on which the mooring link is anchored.

The present disclosure also relates to a fall protection securing method of a connecting pin, to retain and prevent the fall of the connecting pin used for an end-to end assembly of two frame elements of a structure, this fall protection securing method implementing a fall protection device in accordance with the present disclosure, by:

mooring the mooring link to a fixed element;

opening the clamping collar so as to bring it into the open position;

inserting an enlarged head of the connecting pin inside the clamping collar;

closing the clamping collar so as to bring it into the closed position, so that the enlarged head of the connecting pin is locked inside the internal groove of the clamping collar;

locking the clamping collar in the closed position by means of the lock.

According to one possibility, the fixed element on which the mooring link is moored corresponds to one of the two frame elements, preferably with a high mooring, above the connecting pin.

According to another possibility, beforehand, the connecting pin is pushed in the direction of a detachment of its enlarged head relatively to one of the two frame elements, in order to make the enlarged head accessible to insert it inside the clamping collar.

Indeed, if the connecting pin has been put in place by means of a sledgehammer, by striking its enlarged head, it is conventional for the enlarged head to be pressed against one of the two frame elements. It is therefore advantageous to push the connecting pin in the opposite direction, for example by striking on its free end opposite the enlarged head, so as to detach the enlarged head from the frame element, in order to be able to insert this enlarged head inside the clamping collar.

In one embodiment, the fall protection securing method is implemented for a crane structure, such as for example a mast or a boom.

BRIEF DESCRIPTION OF THE DRAWINGS

Other features and advantages of the present invention will become apparent on reading the detailed description below, of a non-limiting example of implementation, made with reference to the appended figures in which.

DESCRIPTION

Figure 1:
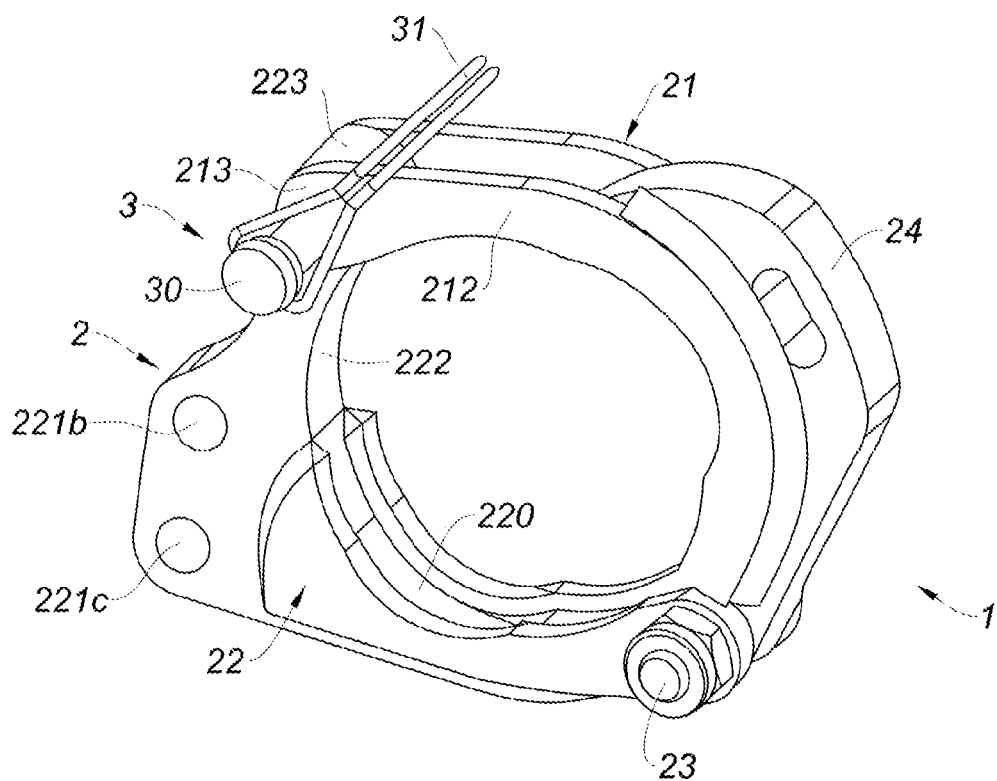
FIG. 1 is a schematic perspective view of a fall protection device according to an embodiment, with a clamping collar in the closed position and locked by means of the lock, and without the mooring link.
Figure 2:
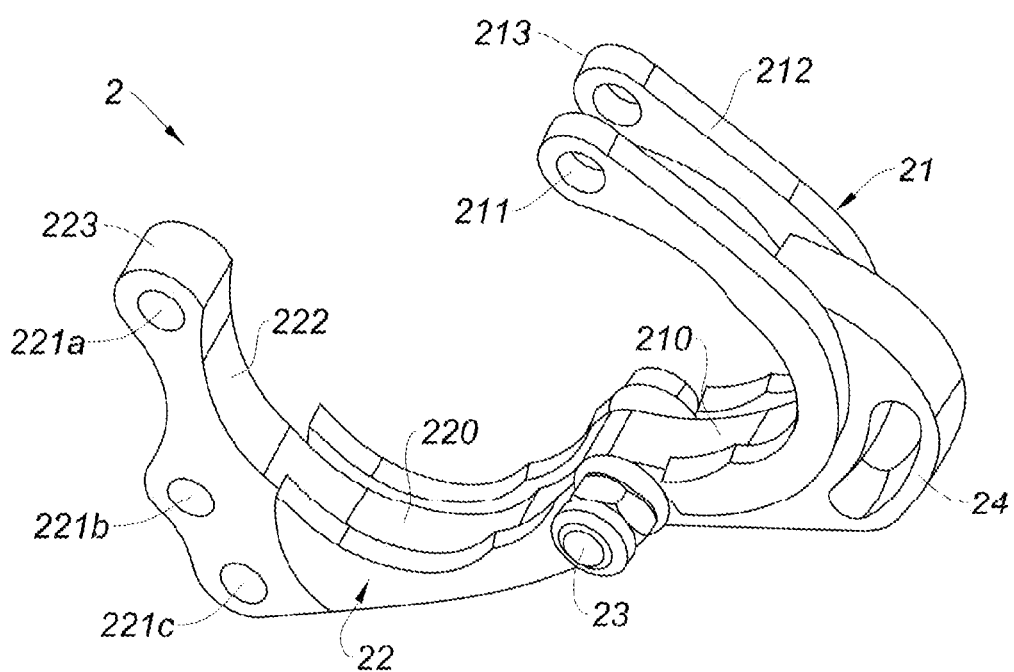
FIG. 2 is a schematic perspective view of the clamping collar of the fall protection device of FIG. 1 in the open position.

Referring to FIGS. 1 and 2, a fall protection device 1 comprises a clamping collar 2 which comprises two jaws 21, 22 (respectively a first jaw 21 and a second jaw 22) connected by a pivot pin 23, so that the two jaws 21, 22 are coupled in rotation, wherein the two jaws 21, 22 each have an internal groove 210, 220 facing each other. Referring to FIGS. 6 to 9, this fall protection device 1 is shaped to retain and prevent the fall of a connecting pin 5 used for an end-to-end assembly of two frame elements 61, 62 of a structure 6, such as for example a crane structure.

The clamping collar 2 is configurable between:

an open position (visible in FIG. 2) in which the jaws 21, 22 are spaced from each other to authorize the insertion of an enlarged head 50 of the connecting pin 5 inside the clamping collar 2, and at least one closed position (visible in FIG. 1) capable of blocking the enlarged head 50 of the connecting pin 5 inside the internal grooves 210, 220 of the jaws 21, 22.

The two jaws 21, 22 are of arcuate or curved shape to match the enlarged head 50 of cylindrical shape which will be found wedged in the internal grooves 210, 220 of the jaws 21, 22.

The fall protection device 1 comprises a lock 3 cooperating with the clamping collar 2 to lock it in the closed position. This lock 3 forms a removable lock which cooperates with the two jaws 21, 22 for a locking in the closed position. This lock 3 is in the form of a locking pin 30 which is engaged in the closed position through locking holes 211, 221a, 221b, 221c provided respectively in the two jaws 21, 22.

The first jaw 21 has a termination 212 provided with two parallel flanges, spaced apart from each other, and a locking hole 211 passes through these two flanges of the termination 212, at its free end 213. The second jaw 22 has a termination 222 which slides between the two flanges of the termination 212 of the first jaw 21 in the closed position, and several locking holes 221a, 221b, 221c pass through this termination 222. The locking holes 211, 221a, 221b, 221c are all equidistant from the pivot axis 23, so that the locking holes 221a, 221b, 221c of the second jaw 22 can all be aligned with the locking hole 211 of the first jaw 21, depending on the relative pivoting between the two jaws 21, 22.

Thus, it is possible to bring the two jaws 21, 22 more or less closer to one another and thus define several closed positions depending on whether the locking pin 30 is engaged through a particular locking hole 221a, 221b, 221c of the second jaw 22. The clamping collar 2 is therefore selectively adjustable in several closed positions in which the clamping collar 2 is more or less closed so as to be adapted to several sizes of the enlarged head 50 of the connecting pin 5, the removable lock 3 being shaped to selectively lock each of the different closed positions.

In the illustrated example, three different locking holes 221a, 221b, 221c are provided on the second jaw 22, thus corresponding to three distinct closed positions associated with three sizes of the enlarged head 50 of the connecting pin 5, which can be called a large size (or large diameter), a medium size (or medium diameter) and a small size (or small diameter).

The locking holes 221 thus comprise:
- a large sized locking hole 221a, which is closest to the free end 223 of the termination 222 of the second jaw 22;
- a small sized locking hole 221c, which is furthest from the free end 223 of the termination 222 of the second jaw 22; and
- a medium sized locking hole 221b, which is between the large sized locking hole 221a and the small sized locking hole 221c.

Figure 3:
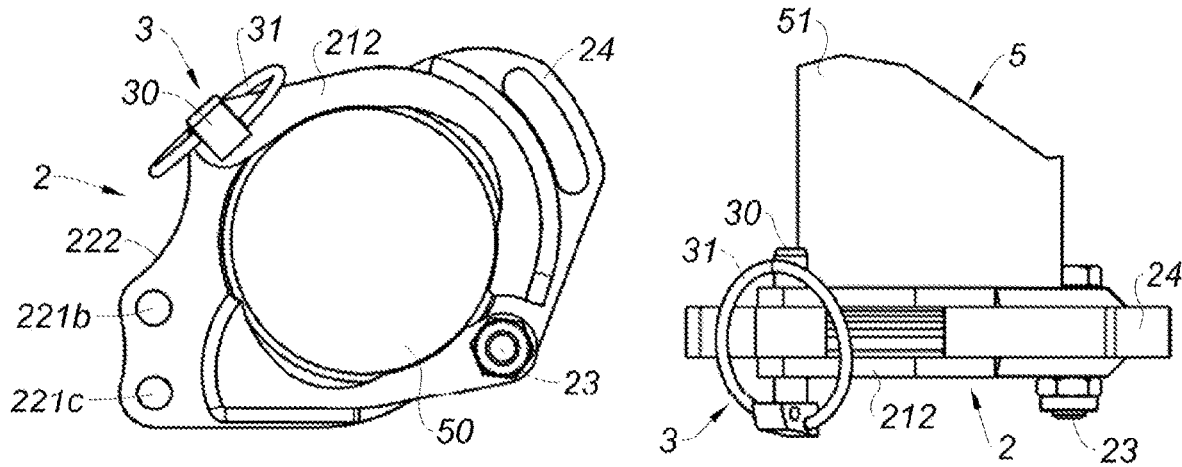
FIG. 3 is a schematic front (on the left) and side (on the right) view of the fall protection device of FIG. 1, with its clamping collar locked in the closed position on a head enlarged by a large sized connecting pin.
Figure 4:
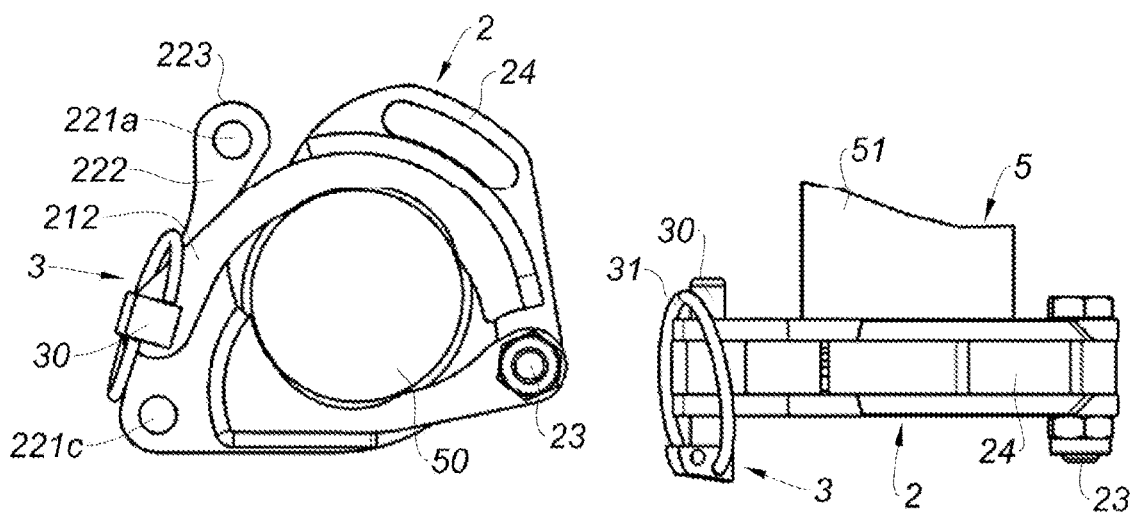
FIG. 4 is a schematic front (on the left) and side (on the right) view of the fall protection device of FIG. 1, with its clamping collar locked in the closed position on a head enlarged by a medium sized connecting pin, compared to FIG. 3.
Figure 5:
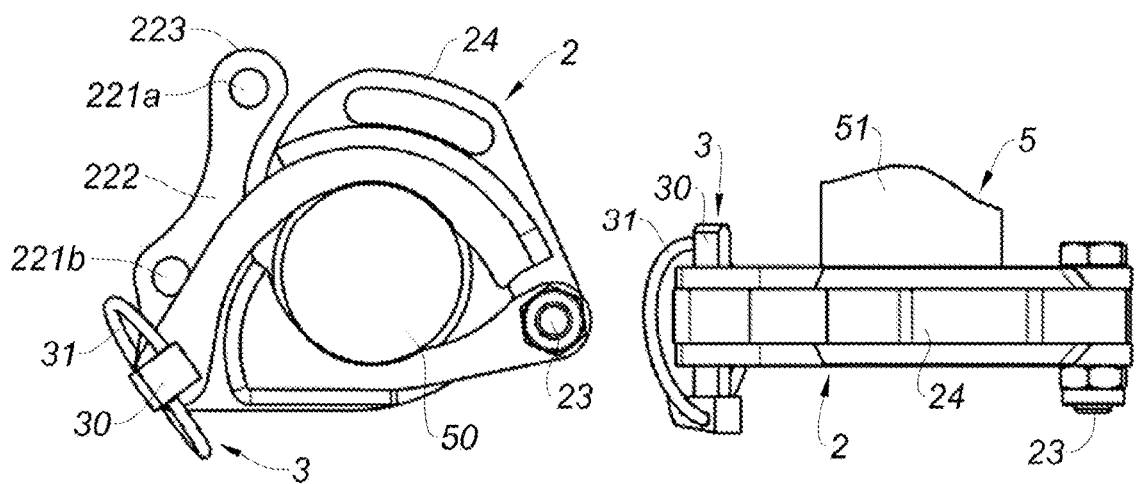
FIG. 5 is a schematic front (on the left) and side (on the right) view of the fall protection device of FIG. 1, with its clamping collar locked in the closed position on a head enlarged by a small sized connecting pin, compared to FIGS. 3 and 4.

FIG. 3 illustrates a situation wherein the clamping collar 2 is locked in a closed position on a large sized enlarged head 50, the locking pin 30 thus passing through the large sized locking hole 221a and the locking hole 211 which are in alignment. FIG. 4 illustrates a situation wherein the clamping collar 2 is locked in a closed position on a medium sized enlarged head 50, the locking pin 30 thus passing through the medium sized locking hole 221b and the locking hole 211 which are in alignment. FIG. 5 illustrates a situation wherein the clamping collar 2 is locked in a closed position on a small sized enlarged head 50, the locking pin 30 thus passing through the small sized locking hole 221c and the locking hole 211 which are in alignment.

As can be seen in FIGS. 1 and 3 to 5, a pin-type clasp 31 is provided to cooperate with the locking pin 30 in order to lock it in position once the locking holes 211, 221a, 221b, 221c have been passed through.

The fall protection device 1 comprises a mooring link 4 anchored on the clamping collar 2, and more precisely on one of the two jaws 21, 22, and therefore the function is to anchor the clamping collar 2 and therefore the fall protection device 1 on a fixed element, such as for example one of the two frame elements 61, 62 or else an operator.

This mooring link 4 (visible in FIGS. 7 to 9) can be formed of a flexible link, such as a strap, a cable, a rope, a chain or any other equivalent link. Thus, this mooring link 4 can be moored on one of the two frame elements 61, 62 for example by belting (as is the case in FIGS. 7 to 9) or by hooking, and for example on the upper frame element 61, that is to say the one located above when the two frame elements 61, 62 are mounted vertically end-to-end.

The clamping collar 2 has a hoop 24 on which the mooring link 4 is anchored, for example by looping. In the illustrated example, this hoop 24 is provided on the first jaw 21, between the termination 212 and the pivot axis 23.

The remainder of the description concerns a fall protection securing method of the connecting pin 5, to retain and prevent the fall of the connecting pin 5 used for an end-to-end assembly of two frame elements 61, 62 of a structure 6, this fall protection securing method implementing the fall protection device 1 described above during the disassembly of these two frame elements 61, 62. This description will be made with reference to FIGS. 6 to 9 which illustrate the different consecutive situations during such a fall protection method.

Figure 6:
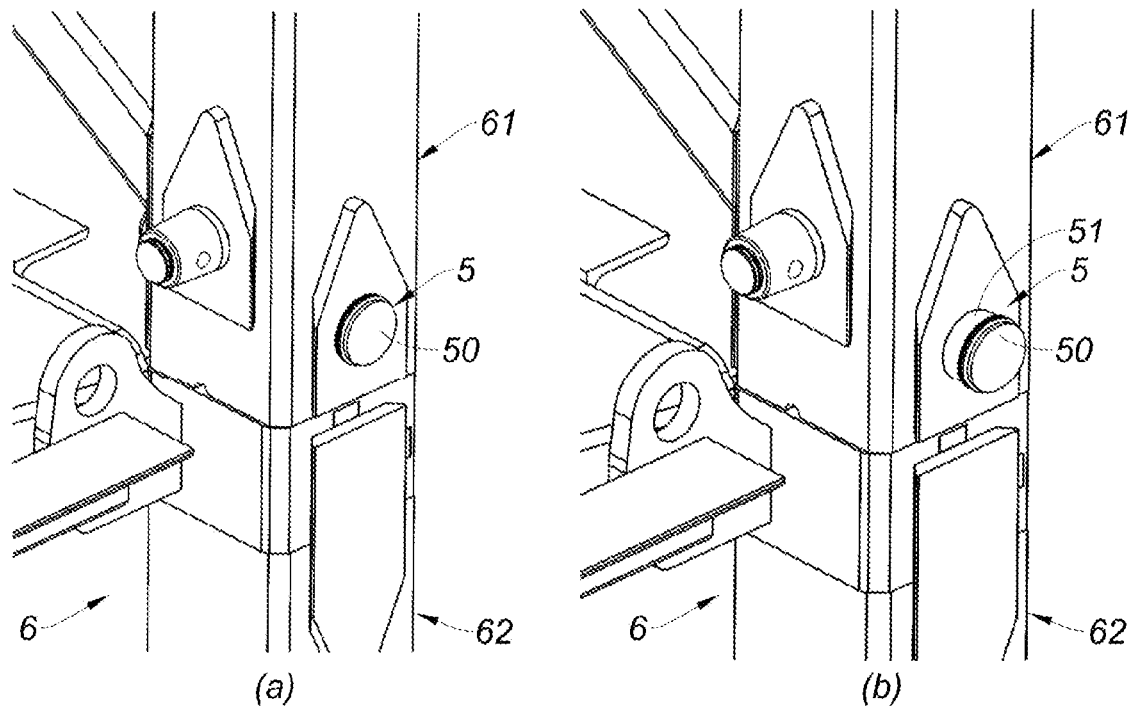
FIG. 6 is a schematic perspective view of two frame elements of a structure assembled end-to-end by means of a connecting pin, in a first situation (FIG. 6(a) on the left) wherein the connecting pin is in an assembly position with its enlarged head which is pressed against one of the two frame elements, and in a second situation (FIG. 6(b) on the right) wherein the connecting pin has been pushed so that its enlarged head is detached from the frame element.

In a first situation illustrated in FIG. 6(*a*), the connecting pin 5 is in an assembly position with its enlarged head 50 which is pressed against one of the two frame elements 61, 62, such as for example the upper frame element 61. The connecting pin 5 has a connecting shaft 51, which extends the enlarged head 50, and which passes through the two frame elements 61, 62.

In a second situation illustrated in FIG. 6(*b*), the connecting pin 5 has been pushed, for example by means of a rod struck against the free end of the connecting shaft 51, so that its enlarged head 50 is detached from the upper frame element 61, thus making the enlarged head 50 accessible for insertion inside the clamping collar 2.

Figure 7:
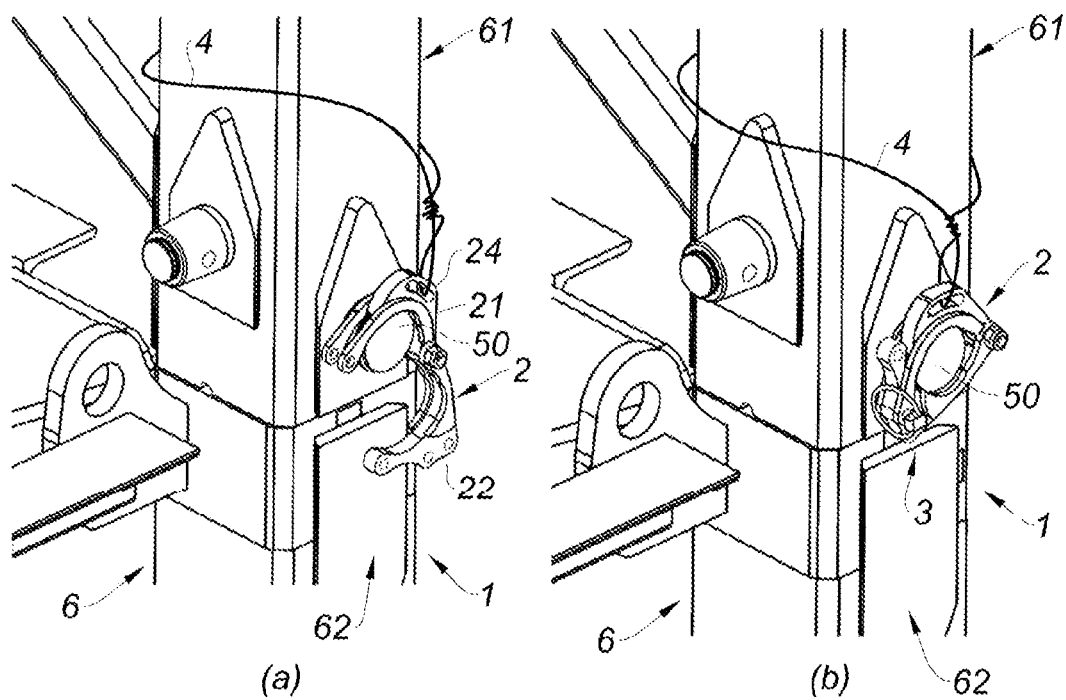
FIG. 7 is a schematic perspective view of the two frame elements of FIG. 6, in a third situation (FIG. 7(a) on the left) wherein the clamping collar of the fall protection device of FIG. 1 is placed in an open position around the enlarged head of the connecting pin, and in a fourth situation (FIG. 7(b) on the right) wherein the clamping collar is closed and locked around the enlarged head of the connecting pin, the mooring link being moored in height on a frame element.

In a third situation illustrated in FIG. 7(*a*), the mooring link 4 is anchored to the upper frame element 61, for example by belting, and the clamping collar 2 is in the open position and this clamping collar 2 is placed around the enlarged head 50.

In a fourth situation illustrated in FIG. 7(*b*), the enlarged head 50 of the connecting pin 5 being inside the clamping collar 2, this clamping collar 2 is closed, so as to bring it into a closed position so that the enlarged head 50 is blocked inside the clamping collar 2, and the locking pin 30 of the lock 3 is positioned to lock the clamping collar in the closed position, and the clasp 31 is put in place to block the locking pin 30.

Figure 8:
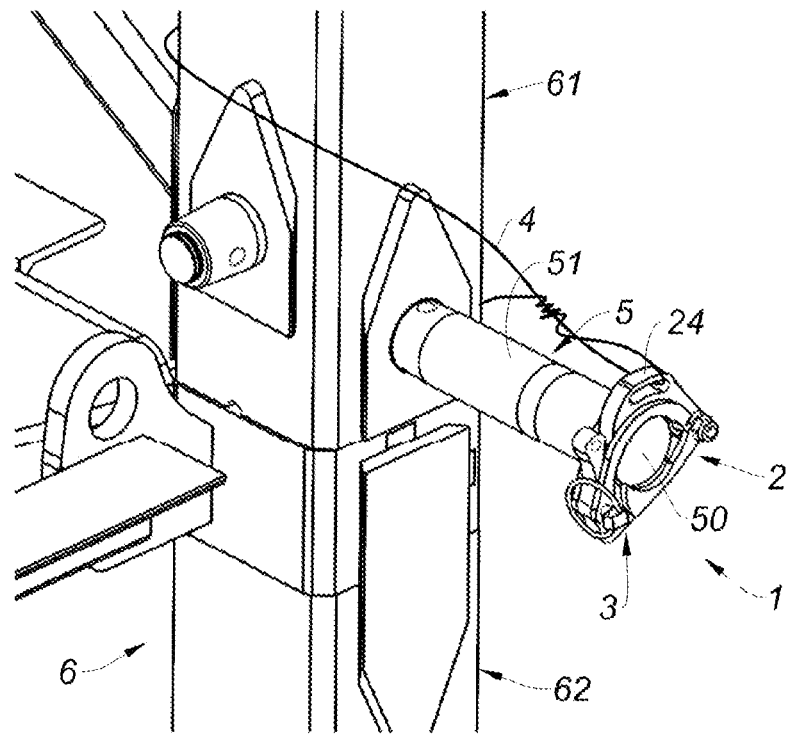
FIG. 8 is a schematic perspective view of the two frame elements of FIGS. 6 and 7, in a fifth situation wherein the connecting pin is pushed out of the frame elements, with the clamping collar of the fall protection device of FIG. 1 closed and locked around its enlarged head.

In a fifth situation illustrated in FIG. 8, the connecting pin 5 is pushed out of the frame elements 61, 62, for example by means of a rod struck against the free end of the connecting shaft 51, with the clamping collar 2 closed and locked around its enlarged head. Thus, when the connecting shaft 51 comes completely out of the frame elements 61, 62, it falls but is retained by the clamping collar 2 which is itself retained by the mooring link 4.

Figure 9:
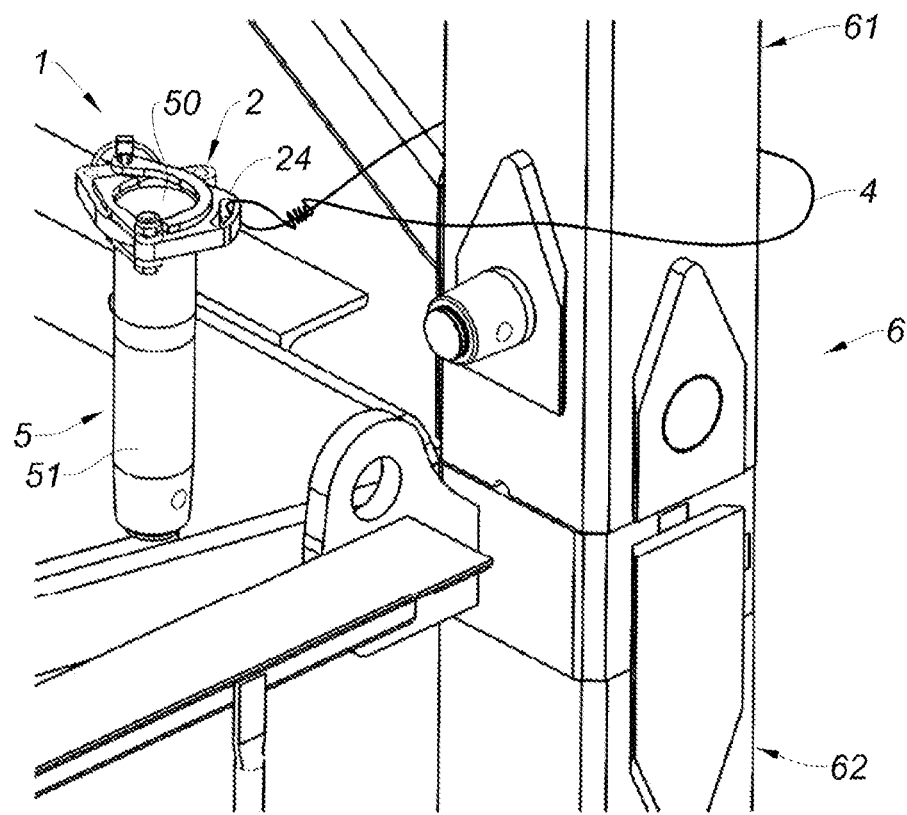
FIG. 9 is a schematic perspective view of the two frame elements of FIGS. 6 to 8, in a sixth situation wherein the connecting pin is completely pushed out of the frame elements, with the clamping collar of the fall protection device of FIG. 1 closed and locked around its enlarged head.

In a sixth situation illustrated in FIG. 9, the connecting pin 5 is completely pushed out of the frame elements 61, 62, without having fallen thanks to the fall protection device 1, and the operator can now take hold of the connecting pin 5 and then unlock and open the clamping collar 2.

It should be noted that this fall protection device 1 is particularly suitable for operations at height, and in particular on a crane structure 6, such as for example a mast or a boom.

The invention claimed is:

1. A fall protection device configured to retain and prevent the fall of a connecting pin used for end-to-end assembly of two frame elements of a structure, the fall protection device comprising:
   a clamping collar having at least one internal groove, the clamping collar being configurable between an open position to permit insertion of an enlarged head of the connecting pin inside the clamping collar, and at least one closed position to retain the enlarged head of the connecting pin inside the internal groove of the clamping collar;
   a lock cooperating with the clamping collar to lock the clamping collar in the closed position; and
   a mooring link anchored to the clamping collar to moor the fall protection device on a fixed element,
   wherein the clamping collar comprises two jaws connected by a pivot pin, so that the two jaws are coupled in rotation, wherein the two jaws each have an internal groove facing each other so that the enlarged head of the connecting pin is locked inside respective internal grooves in the closed position, wherein the lock cooperates with the two jaws for locking the two jaws in the closed position, and wherein the lock is in the form of a locking pin which is engaged in the closed position through locking holes provided respectively in the two jaws.

2. The fall protection device according to claim 1, wherein the clamping collar is selectively adjustable in several closed positions so as to be adapted to several sizes of the enlarged head of the connecting pin, the lock being shaped to selectively lock the clamping collar in each of the different closed positions.

3. The fall protection device according to claim 1, wherein the clamping collar is selectively adjustable in several closed positions so as to be adapted to several sizes of the enlarged head of the connecting pin, the lock being shaped to selectively lock the clamping collar in each of the different closed positions, and wherein at least one of the two jaws has several locking holes, in order to define the several closed positions.

4. The fall protection device according to claim 1, comprising a clasp adapted to cooperate with the locking pin to lock the locking pin in position after passing through the locking holes.

5. The fall protection device according to claim 1, wherein the clamping collar has a hoop on which the mooring link is anchored.

6. A fall protection device configured to retain and prevent the fall of a connecting pin used for end-to-end assembly of two frame elements of a structure, the fall protection device comprising:
   a clamping collar having at least one internal groove, the clamping collar being configurable between an open position to permit insertion of an enlarged head of the connecting pin inside the clamping collar, and at least one closed position to retain the enlarged head of the connecting pin inside the internal groove of the clamping collar;
   a lock cooperating with the clamping collar to lock the clamping collar in the closed position; and
   a mooring link anchored to the clamping collar to moor the fall protection device on a fixed element,
   wherein the structure is a crane structure.

7. A fall protection device configured to retain and prevent the fall of a connecting pin used for end-to-end assembly of two frame elements of a structure, the fall protection device comprising:
   a clamping collar having at least one internal groove, the clamping collar being configurable between an open position to permit insertion of an enlarged head of the connecting pin inside the clamping collar, and at least one closed position to retain the enlarged head of the connecting pin inside the internal groove of the clamping collar;
   a lock cooperating with the clamping collar to lock the clamping collar in the closed position; and
   a mooring link anchored to the clamping collar to moor the fall protection device on a fixed element,
   wherein the fixed element is one of the two frame elements.

8. A fall protection securing method of a connecting pin using a fall protection device to retain and prevent the fall of the connecting pin used for an end-to-end assembly of two frame elements of a structure, the fall protection device including a clamping collar configurable between an open position to permit insertion of an enlarged head of the connecting pin inside the clamping collar, and at least one closed position to retain the enlarged head of the connecting pin inside the internal groove of the clamping collar, a lock cooperating with the clamping collar to lock the clamping collar in the closed position, and a mooring link anchored to the clamping collar to moor the fall protection device on a fixed element, the securing method comprising:
   mooring the mooring link on the fixed element;
   opening the clamping collar so as to bring it into the open position;
   inserting the enlarged head of the connecting pin inside the clamping collar;
   closing the clamping collar so as to bring the clamping collar into the closed position, so that the enlarged head of the connecting pin is retained inside the internal groove of the clamping collar; and
   locking the clamping collar in the closed position with the lock.

9. The fall protection securing method according to claim 8, wherein the fixed element on which the mooring link is moored corresponds to one of the two frame elements.

10. The fall protection securing method according to claim 8, wherein, first, the connecting pin is pushed in the direction of a detachment of its enlarged head relative to one of the two frame elements, in order to make the enlarged head accessible for insertion into the clamping collar.

11. The fall protection securing method according to claim 8, implemented for a crane structure.

12. The fall protection securing method according to claim 11, wherein the crane structure includes is a mast or a boom, and the fall protection device is provided on the mast or the boom.

13. A crane structure comprising:
   a first frame element;
   a second frame element arranged end-to-end with the first frame element;
   a connecting pin connecting the first frame element to the second frame element to form an end-to-end frame assembly, the connecting pin having a connecting shaft extending through the first frame element and the second frame element and an enlarged head at one end of the connecting shaft arranged adjacent to one of the first frame element and the second frame element; and
   a fall protection device configured to retain and prevent a fall of the connecting pin from the end-to-end frame assembly, the fall protection device comprising:
      a clamping collar having at least one internal groove, the clamping collar configurable between an open position configured to receive the enlarged head of the connecting pin and at least one closed position configured to retain the enlarged head of the connecting pin inside the internal groove of the clamping collar;
      a lock cooperating with the clamping collar to lock the clamping collar in the at least one closed position; and
      a mooring link anchored to the clamping collar and one of the first frame element and the second frame element to moor the fall protection device on the end-to-end frame assembly.

14. The crane structure of claim 13, wherein the end-to-end frame assembly is part of a tower crane mast.

15. The crane structure of claim 13, wherein the end-to-end frame assembly is part of a crane boom.

* * * * *